(12) United States Patent
Takeo

(10) Patent No.: US 7,023,634 B2
(45) Date of Patent: Apr. 4, 2006

(54) DATA CHANNEL FOR PROCESSING USER DATA AND SERVO DATA IN A DISK DRIVE ADOPTING PERPENDICULAR MAGNETIC RECORDING SYSTEM

(75) Inventor: Akihiko Takeo, Kunitachi (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 153 days.

(21) Appl. No.: 10/228,340

(22) Filed: Aug. 27, 2002

(65) Prior Publication Data

US 2003/0063406 A1    Apr. 3, 2003

(30) Foreign Application Priority Data

Sep. 28, 2001    (JP)    ............... 2001-303879

(51) Int. Cl.
*G11B 5/09*    (2006.01)
*G11B 20/10*    (2006.01)
*G11B 5/035*   (2006.01)

(52) U.S. Cl. ............... 360/39; 360/46; 360/65
(58) Field of Classification Search ................. 360/39, 360/32, 65
See application file for complete search history.

(56) References Cited

U.S. PATENT DOCUMENTS

| | | | | |
|---|---|---|---|---|
| 5,341,249 A | * | 8/1994 | Abbott et al. ................. | 360/46 |
| 5,357,378 A | | 10/1994 | Urakawa | |
| 5,384,671 A | * | 1/1995 | Fisher ........................ | 360/51 |
| 5,729,410 A | | 3/1998 | Fontana, Jr. et al. | |
| 5,886,842 A | * | 3/1999 | Ziperovich .................. | 360/51 |
| 5,955,211 A | | 9/1999 | Maeda et al. | |
| 6,097,579 A | | 8/2000 | Gill | |
| 6,178,053 B1 | * | 1/2001 | Narita ........................ | 360/25 |
| 6,178,144 B1 | * | 1/2001 | Huber ..................... | 369/13.02 |
| 6,337,889 B1 | * | 1/2002 | Mita et al. .................. | 375/341 |
| 6,671,112 B1 | * | 12/2003 | Murakami et al. ............ | 360/39 |
| 2002/0089773 A1 | * | 7/2002 | Shimomura et al. .......... | 360/67 |

FOREIGN PATENT DOCUMENTS

| | | | |
|---|---|---|---|
| JP | 2-126404 | | 5/1990 |
| JP | 5-101312 | | 4/1993 |
| JP | 11-066755 A | | 3/1999 |
| JP | 11066755 A | * | 3/1999 |
| JP | 2001-189001 | | 7/2001 |

OTHER PUBLICATIONS

Muraoka et al., "Evaluation of the Error Rate for a Single-Pole Writing Head and Double-Layer Perpendicular Media," Journ. Of Magnetics Soc of Japan #23, pps 1065-1068.

(Continued)

*Primary Examiner*—David Hudspeth
*Assistant Examiner*—Daniell L. Negron
(74) *Attorney, Agent, or Firm*—Pillsbury Winthrop Shaw Pittman, LLP

(57) ABSTRACT

Provided in a disk drive of a perpendicular magnetic recording system is a data channel to execute signal processing suited to the characteristics of either servo data signals or user data signals read from a disk. This data channel decodes data by executing PRML signal processing of positive coefficient PR equalization for data signals of vertical rectangular waveform in the read signals read by a read head from the disk. The data channel converts servo signals of vertical rectangular waveform into differentiated waveform signals, and reproduces servo data from the differentiated waveform signals.

2 Claims, 4 Drawing Sheets

OTHER PUBLICATIONS

Yamoto et al., "A Study of PRML Systems for Perpendicular Recording Using Double layered Medium," IEE Trans. On Magnetics, vol. 36, #5 (2000), pps 2164-2166.

Japanese Office Action, dated Jul. 27, 2004 from the Japanese Patent Office for Application No. 2001-303879.

* cited by examiner

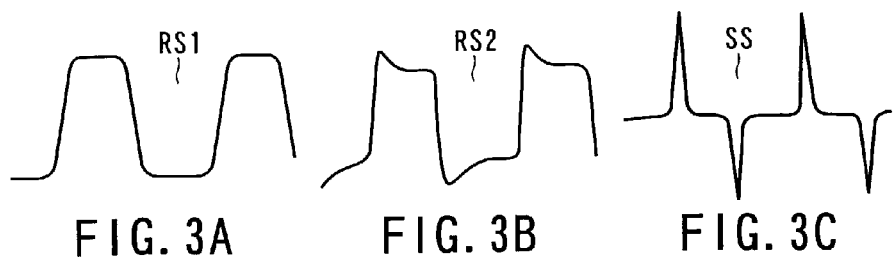
FIG. 3A   FIG. 3B   FIG. 3C
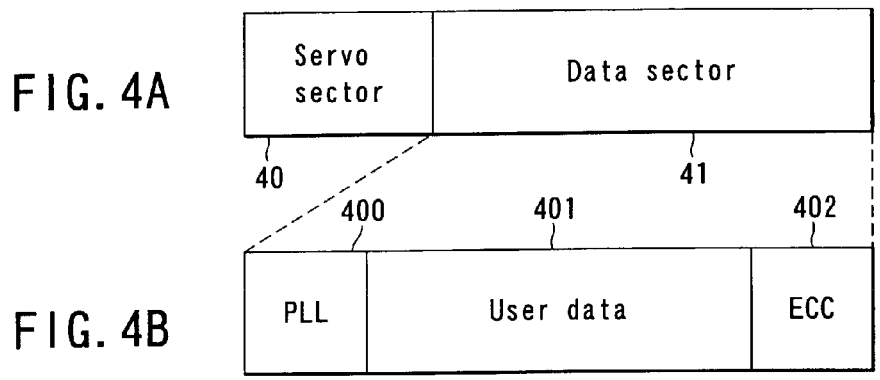
FIG. 4A
FIG. 4B
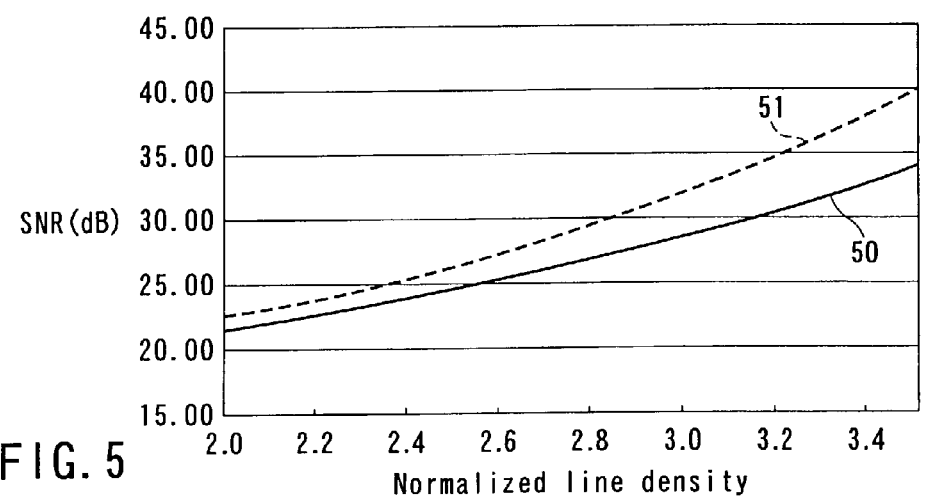
FIG. 5

DATA CHANNEL FOR PROCESSING USER DATA AND SERVO DATA IN A DISK DRIVE ADOPTING PERPENDICULAR MAGNETIC RECORDING SYSTEM

CROSS-REFERENCE TO RELATED APPLICATIONS

This application is based upon and claims the benefit of priority from the prior Japanese Patent Application No. 2001-303879, filed Sep. 28, 2001, the entire contents of which are incorporated herein by reference.

BACKGROUND OF THE INVENTION

1. Field of the Invention

The present invention relates generally to a magnetic disk drive, and particularly to a disk drive adopting a perpendicular magnetic recording system.

2. Description of the Related Art

In recent years, perpendicular magnetic recording has been noticed as a technique to overcome the limits of recording density of longitudinal magnetic recording in the field of magnetic disk drives represented by hard disk drives.

In perpendicular magnetic recording, when digital data (0/1) is recorded on a disk medium, a magnetizing area is formed for the data in a direction perpendicular (depth) to the disk medium. A read signal read by a read head from the disk medium has a rectangular waveform as a result of changing its amplitude at the magnetizing direction changing point and adapting to the changed magnetizing direction.

Further, recent disk drives adopt a magnetic head in which the read head and write head are separately mounted on a slider. The write head is usually a single-pole type head suitable for perpendicular magnetic recording. The read head usually employs a GMR (Giant Magnetoresistive) element or a spin valve type MR element.

In perpendicular magnetic recording, the read signal read by the read head from the disk medium is changed in its amplitude at the point of changing the disk magnetizing direction and adapted to the changed magnetizing direction, and resultantly has a rectangular waveform.

This waveform is usually equivalent to that obtained by integrating the waveform of a read signal in longitudinal magnetic recording. Thus, a disk drive adopting a perpendicular magnetic recording system needs a differentiating circuit to convert a read signal from the read head into a signal with a differentiated waveform in its signal processing circuit in order to decode (reproduce) recorded data from read signals. This signal processing circuit is called a data channel or a read/write channel, and it usually employs the PRML (Partial Response Maximum Likelihood) signal processing method.

In short, for practical use of a disk drive adopting a perpendicular magnetic recording system, a data channel used in a conventional longitudinal magnetic recording method can be reused by converting a rectangular waveform read signal into a differentiated waveform signal.

However, if a read signal from the read head is differentiated and equalized in a differentiating circuit, noise (system noise) contained in the read signal is emphasized in its high-frequency component. This makes it difficult to ensure a satisfactory signal-to-noise ratio for a drive system particularly with wide-range read signals (user data signals). In other words, this increases the error rate when reproducing recorded data from read signals.

There is a method of directly processing a rectangular waveform read signal in a perpendicular magnetic recording system without converting it into a differentiated waveform signal. This is PRML signal processing based on positive coefficient PR (Partial Response) equalization (corresponding to PR class 1 or 2), which is applicable to a perpendicular magnetic recording system. However, a rectangular waveform read signal contains a DC component, which causes distortion of the signal waveform and fluctuation in signal amplitude when the signal is transmitted through a circuit having a high low-frequency cut-off frequency.

It is to be noted that a signal read from a disk medium by the read head in a disk drive includes servo data signals recorded in a servo area, in addition to user data signals. The disk drive incorporates a servo system which controls the position of the magnetic head on the disk medium according to the servo data reproduced by the data channel. This servo system detects the head position depending on the amplitude of the servo signal, and the fluctuation in the amplitude of the servo signal must be suppressed.

BRIEF SUMMARY OF THE INVENTION

An object of the present invention is to provide a disk drive of a perpendicular magnetic recording system which executes signal processing suited to the characteristics of either servo data signals of user data signals when reproducing data.

An aspect of the present invention relates to a PRML data channel for processing user data signals and servo data signals in a disk drive adopting a perpendicular magnetic recording system.

According to an aspect of the invention, there is provided a disk drive adopting a perpendicular magnetic recording system and including a PRML data channel for processing user data signals and servo data signals.

This data channel decodes the user data by executing PRML signal processing based on positive coefficient PR equalization for the user data signals of vertical rectangular waveforms output from the read head. This data channel converts servo data signals into differentiated waveform signals, and decodes the servo data from the differentiated waveform signals.

A disk drive unit of the invention comprises a disk medium to record servo data and user data by a perpendicular magnetic recording method, a read head to read out servo data signals or user data signals from the disk medium, and a data channel to reproduce the user data and the servo data by processing the user data signals read from the read head based on positive coefficient PR (Partial Response) equalization and converting the servo data signals into differential signals.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the embodiments given below, serve to explain the principles of the invention.

FIGS. 3A to 3C illustrate the waveforms of a read signal according to the same embodiment of the invention;

FIGS. 4A and 4B illustrate the track formats according to the same embodiment of the invention;

FIG. 5 is graph showing the characteristics of positive coefficient PR equalization according to the same embodiment of the invention;

DETAILED DESCRIPTION OF THE INVENTION

Hereinafter preferred embodiments of the present invention will be explained with reference to the accompanying drawings.

(Disk Drive Configuration)

Figure 1:
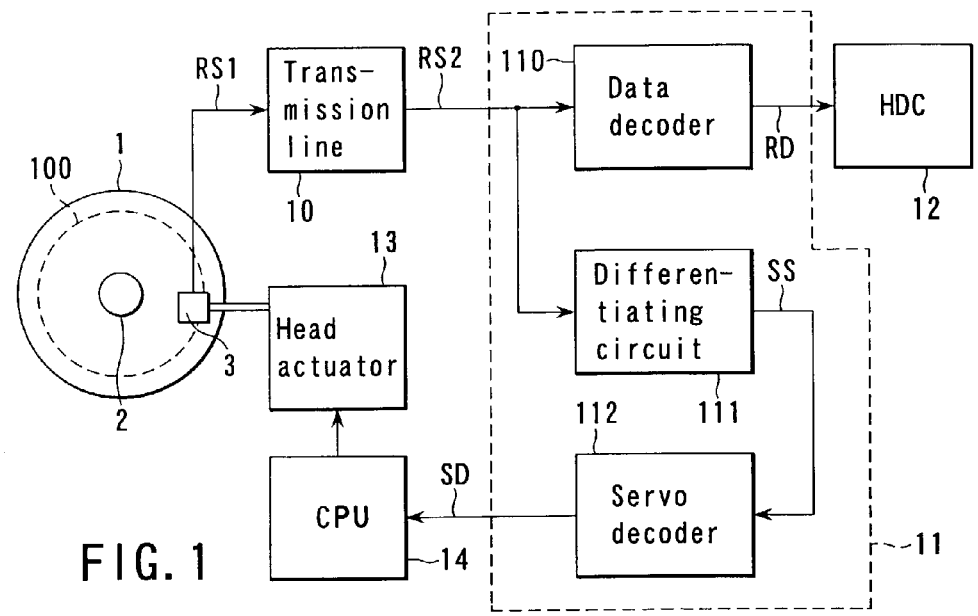
FIG. 1 is a block diagram showing the essential parts of a data channel according to an embodiment of the present invention.
Figure 2:
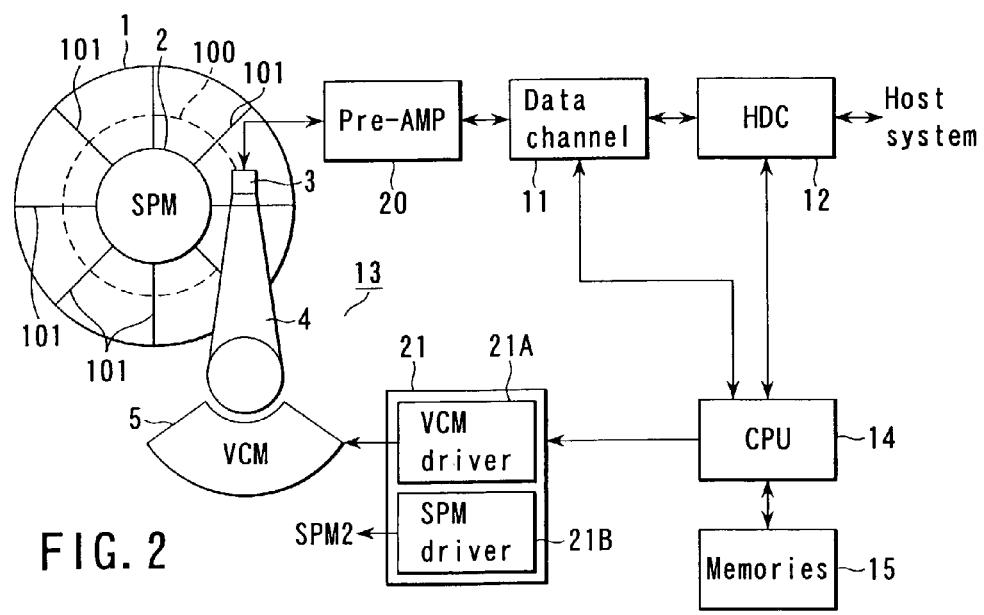
FIG. 2 is a block diagram showing the essential parts of a disk drive according to the same embodiment of the invention.
Figure 7:
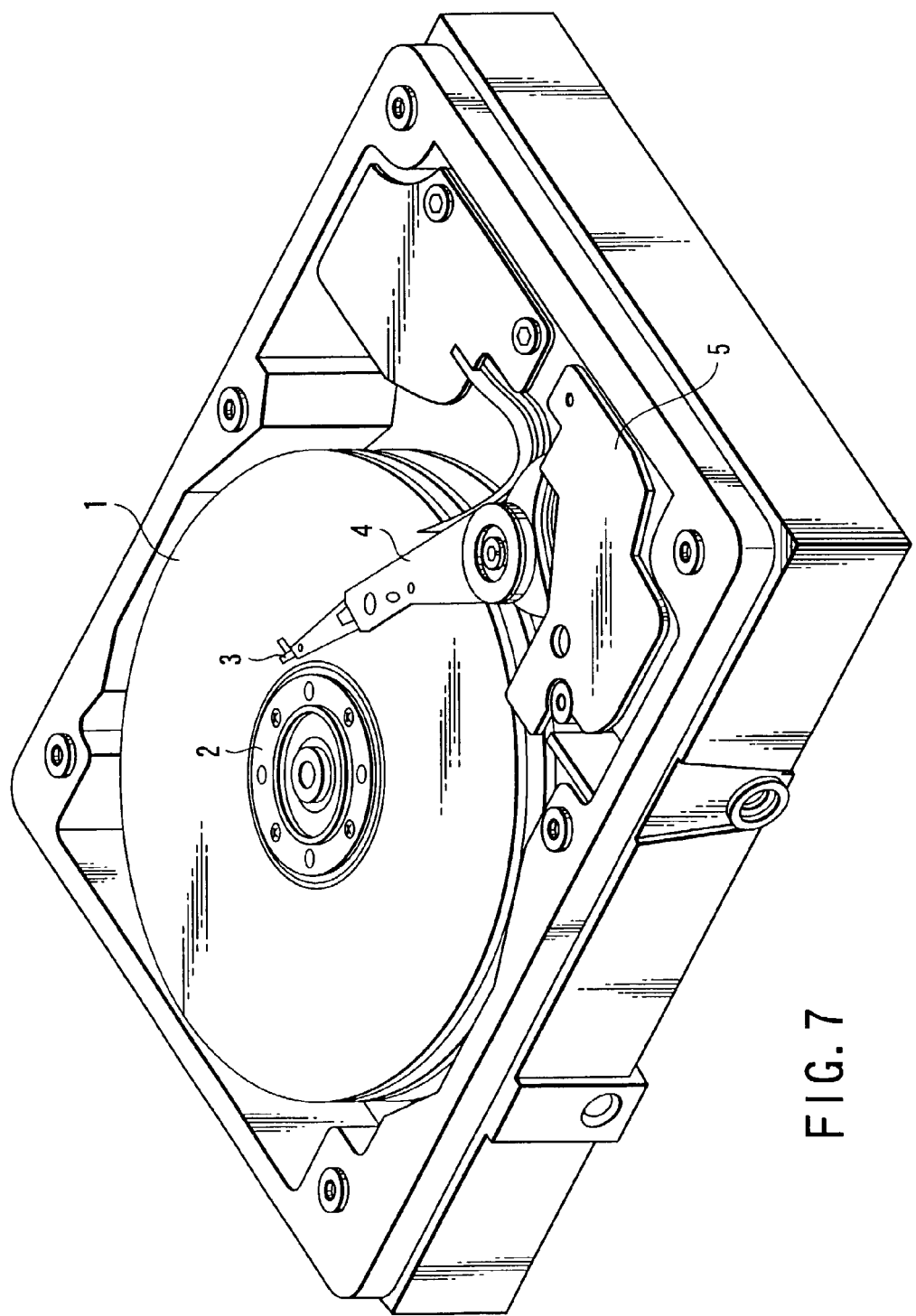
FIG. 7 is an external view of a disk drive pertaining to the same embodiment of the invention.

FIGS. 1, 2 and 7 are block diagrams showing the essential part of a disk drive adopting the perpendicular magnetic recording system according to an embodiment of the present invention.

The disk drive has a disk medium 1 for perpendicular magnetic recording. The disk medium 1 is a double-layered perpendicular recording medium comprising a perpendicular recording magnetic layer and a soft magnetic layer, and is driven at a high speed by a spindle motor (SPM) 2.

The disk drive has a magnetic head 3 to read/write data from/to the disk 1 driven by the SPM 2. The magnetic head is provided with a read head and a write head being separately mounted on the same slider. The read head employs, for example, a shield type MR element, a GMR (Giant Magnetoresistive) element, a spin valve type MR element or a TMR (Tunneling Magnetoresistive) element. The write head consists of a single-pole type head suitable for perpendicular magnetic recording. The magnetic head 3 is mounted on a head actuator 13 which is included in a servo mechanism. The head actuator 13 is a device to position the magnetic head 3 at a target place on the disk medium 1, and is controlled by a microprocessor (CPU) 14.

A data channel (read/write channel) 11 inputs/outputs the read/write signals to/from the magnetic head 3 through a transmission line 10. The transmission line 10 consists mainly of a preamplifier 20, as shown in FIG. 2. The preamplifier 20 has a read amplifier to amplify the read signal (vertical rectangular waveform signal RS1) outputted from the read head and transmit it to the data channel 11. The preamplifier 20 also includes a write amplifier to convert the write signal output from the data channel 11 and transmit it to the write head.

The data channel 11 is largely divided into a read channel to perform PRML processing of the read signal and a write channel to encode the write data. Since this embodiment relates to a data reproducing function, the description of the write channel is omitted here. The data channel 11 will mean a read channel in the following descriptions.

The data channel 11 includes a data decoder 110, a differentiating circuit 111 and a servo decoder 112. The data decoder 110 decodes the user data (recorded data) from the data signal (user data signal) included in the read signal (RS2) transmitted over the transmission line 10. The data decoder 110 is a PRML signal processor based on positive coefficient PR equalization, and sends the user data RD to a disk controller (HDC) 12.

The differentiating circuit 111 is a differentiator-equalizer to convert the read signal (RS2) transmitted over the transmission line 10 into a differential waveform signal. The servo decoder 112 extracts servo signals from the signals (SS) differentiated by the differentiating circuit 111, and decodes servo data (SD) from said servo signals. The servo decoder 112 sends the decoded servo data (SD) to a CPU 14. The CPU 14 controls the position of the head 3 by the reproduced servo data SD.

The disk medium 1 has a plurality of concentrically formed tracks 100, as shown in FIG. 2. The disk 1 also includes radial servo areas 101 arranged circumferentially at predetermined intervals.

Each servo area 101 includes a servo sector 40 for each track. Each servo sector 40 records patterns which are roughly divided into an address pattern (address code) to indicate a track address and a servo burst pattern to detect a positioning error in a track. These patterns are called servo data (SD).

In each track, a plurality of data sectors 41 is usually arranged between servo sectors 40, as shown in FIG. 4A. A data sector may be partially divided and called a split data field. Each data sector 41 has a synchronizing signal area 400 also called a PLL area at the beginning, a user data area 401 in the middle and an ECC (error correction code) area 402 at the end. The synchronizing signal area 400 consists of a repetition signal pattern of predetermined frequency.

The head actuator 13 includes an arm 4 with a head 3 and a voice coil motor (VCM) 5. The VCM 5 is driven by a VCM driver 21A. The actuator 13 is movable radially over the disk 1 by the VCM driving force. The CPU 14 controls the VCM driver 21A thereby controlling the positioning of the head 3 mounted on the actuator 13. The VCM driver 21A is integrated as a motor driver IC 21 together with an SPM driver 21B which drives and controls the SPM 2.

The CPU 14 is the main controller of the disk drive, and executes various controls such as positioning of the head and read/write operations. Memories 15 include RAM and flash EEPROM to store the programs and data required by the CPU 14 to execute the controls.

The disk controller (HDC) 12 constitutes an interface between the disk drive and a host system, and controls mainly the transmission of read/write data.

The above-mentioned disk drive comprises a disk medium 1, a SPR 2, an arm 4 with a head 3 and head actuator such as a VCM 5 contained in an aluminum alloy case, for example, as shown in FIG. 7.

(Data Reproduction)

Description will now be given of the reading operation of the data channel 11 in a disk drive according to the above-mentioned embodiment, and the effects of the same embodiment.

First, the read signal RS1 read by the read head from the disk medium 1 of a perpendicular magnetic recording system is a vertical rectangular waveform read signal, as shown in FIG. 3A. The read signal RS1 becomes a distorted waveform signal RS2 after passing through the transmission line 10 (e.g., a read amplifier), as shown in FIG. 3A.

The transmission line 10 does not pass a DC component of the signal, and includes a read amplifier which cuts off low frequencies around several 100 kHz, for example. Thus, the read signal RS2 having a distorted waveform is applied directly to the data channel 11.

(Servo Signal Processing)

The read signal RS2 applied to the data channel 11 contains a servo signal output from a servo sector 40. (See FIG. 3C.) The servo decoder 112 extracts a servo signal from a differentiated signal SS output from the differentiating circuit 111. The servo decoder 112 decodes (reproduces) servo data SD from servo signals or differentiated waveforms by a simple peak detect system, or the usual PRML signal processing adopting a PR4 system, for example.

As explained above, the CPU 14 controls the position of the head 3 by using the servo data SD output from the data channel 11. The servo signal and data signal are discriminated by the gate signals of the servo sector and data sector, and branched to respective signal processing circuits (110 or 111).

Figure 6A:
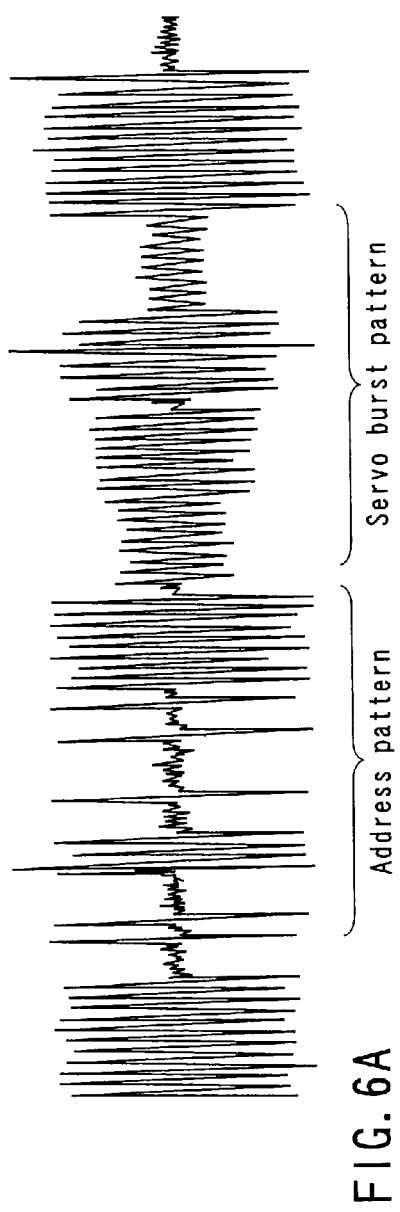
FIGS. 6A and 6B illustrate the waveforms of servo data signals according to the same embodiment.
Figure 6B:
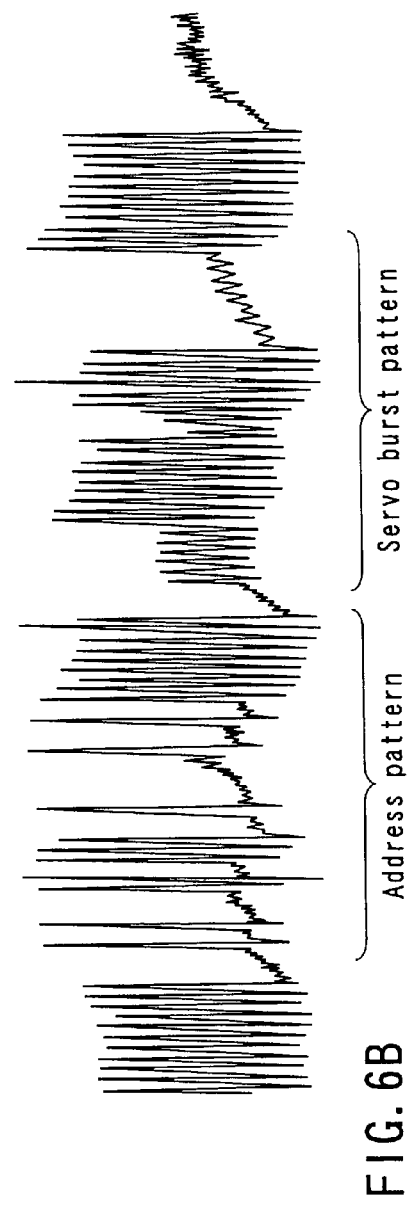

In the positioning control, the CPU 14 uses the amplitude of the servo signal to detect the position of the head 3. Therefore, when distortion occurs in the read signal or a vertical rectangular waveform RS2, amplitude fluctuation (distortion) occurs in the servo burst pattern contained in the servo signal, as shown in FIG. 6B. FIG. 6A shows the patterns of normal servo signals SS free from amplitude fluctuation. Such amplitude fluctuation in the servo signal will affect the accuracy of the positioning control by the CPU 14.

The differentiating circuit 111 in the data channel 11 differentiates a servo signal of vertical rectangular waveform, and provides a differential signal SS containing no DC component. (See FIG. 3C.) A servo signal extracted from this differential signal SS is not distorted in its waveform even after passing through the transmission line 10 having a high low-frequency cut-off characteristic, and therefore its waveform is the same as that of a servo signal in conventional longitudinal magnetic recording.

(Data Signal Processing)

The data decoder 110 in the data channel 11 decodes the data signal RS corresponding to the user data 401 in the data sector 41. (See FIG. 4B.) The data decoder 110 is a PRML signal processor based on positive coefficient PR equalization applicable to vertical rectangular waveform signals, and decodes user data RD from data signals having a vertical rectangular waveform. Namely, the data channel 11 of this embodiment processes a data signal, or a vertical rectangular waveform, without converting it into a differentiated waveform. Accordingly, the data decoder 110 of this embodiment needs no differentiating circuit.

FIG. 5 is a graph comparing the data decoding characteristic (50) based on the positive coefficient PR equalization of the present embodiment with the characteristic of the data channel (51) employing a differentiator-equalizer and PR4 system to obtain the same signal as that adopted by a conventional longitudinal magnetic recording method.

That is, FIG. 5 shows the signal-to-noise ratio (SNR) required to get a normalized line density. The normalized line density (LD) is defined as a half-amplitude level of differentiated waveform/transfer bit length. As the signal-to-noise ratio required for a transfer rate is also dependent on the resolution of the read signal waveform, the normalized line density is plotted along the abscissa. The signal-to-noise ratio is defined as the value required to ensure a certain error rate (e.g., the $-6^{th}$ power of 10).

There is little difference between these two signal processing methods (50 and 51) in the area where the normalized line density is low. But, as shown in FIG. 5, when the normalized line density rises over 2, the required signal-to-noise ratio rises relatively in the conventional method (51) compared to the present embodiment method (50). In other words, when the normalized line density rises over 2, the present embodiment signal processing method (50) displays a characteristic capable of improving the error rate even with a low signal-to-noise ratio.

Therefore, it can be supposed that since differentiation-equalization is executed for the read signal waveform in the conventional signal processing method (51), a high-frequency range is emphasized even against originally white random system noise and the influence of high-frequency noise is strong when the resolution is low. Accordingly, it can be confirmed that when data recorded with high density is exactly reproduced under the same reproduction resolution, the positive coefficient PR based signal processing method of the present embodiment is relatively excellent. In short, the data channel 11 of the present embodiment processes the read signal leaving its vertical rectangular waveform as it is without executing differentiation-equalization, and this avoids emphasizing the high-frequency component of the noise (system noise). Therefore, the disk drive of the present embodiment as a system can ensure an adequate signal-to-noise ratio, and avoid increasing the read error rate when recorded data is reproduced.

It is common to use a normalized line density several times lower than the data signal transfer bit frequency for the above-mentioned servo signal frequency. Thus, an adequate signal-to-noise ratio is ensured for a servo signal without differentiation or equalization, because the frequency range is narrow and the deterioration caused by the system noise is little.

As a specific form of a disk drive of the present embodiment, it is possible to use a single-pole type head for the write head and a shield type GMR element (shield interval of approx. 90 nm) as the read head. It is also possible to make the disk 1 multi-layered consisting of a soft magnetic layer made of Fe—Al—Si, Co—Zr—Nb, Fe—Ni, Fe—Co or the like, an intermediate control layer, and a recording magnetic layer of Co—Cr-alloy or Co—Pt-alloy with perpendicular anisotropy. Generally, on the surface of the disk 1, a several-millimeter-thick protection layer of C or the like is deposited on the top of the recording layer, and further the surface is coated with a lubricant. For instance, in the present embodiment, the differentiation half-amplitude level is about 95 nm in the isolated differentiated waveform of the read signal read from the read head, and the track density of the disk 1 is about 60 kTPI (0.423 μm track pitch).

In this case, the servo signal frequency is 40 MHz, for example, and the maximum data frequency is about 159 MHz. Generally, the servo signal frequency is often set several times lower than the data signal frequency in order to ensure the servo signal-to noise ratio and to simplify the servo signal processing circuit. In the present embodiment, a differentiating circuit 111 is applied only to the servo signal. This makes it possible to set the high frequency cut-off characteristic of the differentiating circuit 111 only by the servo signal frequency without depending upon the maximum frequency of the data signal.

The design of the differentiating circuit 111 is simple when the cut-off frequency is low, and the signal-to-noise ratio of the servo signal can be improved. In addition, if the high-frequency cut-off characteristic of the differentiating circuit 111 is set equal to the cut-off frequency of the low-pass filter, it becomes needless to provide a low-pass filter in the servo decoder 112, and the circuit configuration becomes simpler.

(Modification)

A disk drive of the present embodiment is called a sector servo system, and controls the head positioning by using a servo signal recorded in the servo sector 40 on the disk 1. A plurality of data sectors 41 is provided between servo sectors in the sector servo system.

Generally, in a disk drive, a non-recording margin area (a gap) is provided between data sectors to permit fluctuation in disk 1 rotation during the write operation to record user data in a data sector 40. As a result, a DC area corresponding to this gap is generated in a space before each data sector. A series of data signals to be read first from a data sector is largely distorted in the low-frequency range by the DC area. In the present embodiment, the influence of this distortion upon the servo signal read from the servo sector 40 is eliminated by differentiation by a differentiating circuit 111. But, the influence cannot be eliminated from the data series to be read first from the data sector 41.

To solve this problem, a false signal area is provided at the beginning data sector 41 to detect DC distortion. In the data channel 11, a circuit for correcting the distortion is provided, which corrects the distortion of the read signal waveform by the detected DC distortion value when data is reproduced. This is a modification of the present embodiment.

A data decoder 110 may receive a read signal with its waveform distortion not eliminated. It has been confirmed that, when a read signal of vertical rectangular waveform appears with maximum DC distortion, the signal amplitude becomes 2 times that of a distortion-free signal. Therefore, the input saturation level of the data decoder 110 is set desirably 2 times or higher the amplitude level of a distortion-free read signal (the output of the read amplifier).

It is also possible to provide no distortion correcting circuit in a data channel 11 and to separate an area influenced strongly by distortion from an area where high data reliability is demanded, as a means of moderating the influence of signal waveform distortion caused by the cutting off of low frequencies. Namely, when a certain DC magnetizing area exists on a disk 1, the area next to this DC area of that read signal will be influenced by the distortion caused by the cutting off of low frequencies. This area has almost the same length as the DC area before a magnetizing direction changing signal. Distortion will also occur in the area after the magnetizing direction changing signal.

As described above, DC magnetization is apt to occur in the marginal area between data sectors. At the beginning of the data sector 41, a PLL area 400 is provided to record a certain repetition frequency signal, as shown in FIG. 4B. The PLL area 400 uses a low frequency compared to the maximum frequency of the data signal, to ensure signal quality. It is desirable to set the dimension of the PLL area 400 longer than the DC area provided before the data sector 41 to minimize the influence of the distortion caused by the DC area. This can prevent at least the random user area 401 in the data sector 41 from being influenced by the waveform distortion. This means a structure such that when the length of the PLL area 400 (synchronizing signal area) is assumed to be L1 and the length of said DC area to be L2, the relation L1<L2 is satisfied.

Further, the data decoder 110 in the data channel 11 of the present embodiment is permitted to use turbo decoding as a method of decoding recorded data from data signals.

As described above, in the present embodiment, a servo-processing channel which reproduces servo data uses the servo signals obtained by differentiating-equalizing the read signals of vertical rectangular waveform. A data processing channel which reproduces user data (recorded data) executes positive coefficient PR equalization to process the read signals as they are.

Therefore, the present embodiment as a servo system can use a servo signal with stable amplitude obtained by suppressing the fluctuation. This realizes accuracy in the head positioning control. Further, as a data reproducing system, a data signal processing system suitable for wide-range high-density recording can be used, realizing high track recording density and high line recording density.

In short, a signal processing method applicable to the characteristics of either the servo signal or data signal can be employed in a disk drive of a perpendicular magnetic recording system. That is, a process of reproducing servo data from differentiated waveform signals is executed for a relatively low frequency servo signal for which a suppressed amplitude fluctuation is demanded. This will realize reproduction of stable and reliable servo data and accurate head positioning control.

Moreover, as positive coefficient PR equalization applicable to a vertical rectangular waveform signal is executed for a wide-range high-density data signal, a signal-to-noise ratio satisfactory for a system can be ensured. Accordingly, the read error rate when reproducing recorded data from read signals can be decreased, and consequently a disk drive of a perpendicular magnetic recording system can be realized with high reliability and high recording density.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A magnetic disk drive comprising:
   a disk medium configured to record servo data and user data by a perpendicular magnetic recording method;
   a read head configured to read servo data signals or user data signals from said disk medium; and
   a data channel configured to reproduce said user data and said servo data by processing said user data signals read from the read head based on positive coefficient partial response (PR) equalization and converting said servo data signals into differential signals,
   wherein said data channel includes a circuit to process signals by said positive coefficient PR equalization, and an input saturation level of said circuit is set to 2 times or greater of an output level of a read amplifier circuit to amplify data signals output from said read head.

2. A magnetic disk drive comprising:
   a disk medium configured to record servo data and user data by a perpendicular magnetic recording method;
   a read head configured to read servo data signals or user data signals from said disk medium; and
   a data channel configured to reproduce said user data and said servo data by processing said user data signals read from the read head based on positive coefficient partial response (PR) equalization and converting said servo data signals into differential signals,
   wherein said disk medium has a plurality of concentrically formed tracks, each of said tracks is provided with servo sectors to record said servo data signals and data sectors to record said user data signals, and a relation $L1<L2$ is satisfied within a certain frequency synchronizing area provided in a beginning portion of each of said data sectors and a DC area provided in a boundary of each of said data sectors, wherein a length of said synchronizing signal area is $L1$ and a length of said DC area is $L2$.

* * * * *